A. R. DAVIS.
Corn Husker.

No. 22,710. Patented Jan'y 25, 1859.

Attest.
N. Ames.
Geo. H. Smith

Inventor.
Abbot R. Davis

UNITED STATES PATENT OFFICE.

ABBOT R. DAVIS, OF EAST CAMBRIDGE, MASSACHUSETTS.

CORN-HUSKER.

Specification of Letters Patent No. 22,710, dated January 25, 1859.

*To all whom it may concern:*

Be it known that I, ABBOT R. DAVIS, of East Cambridge, in the county of Middlesex and Commonwealth of Massachusetts, have invented a new and useful Improvement in Corn-Huskers; and I do hereby declare that the following is a full, clear, and exact description of the construction and operation of the same, reference being had to the accompanying drawings, forming a part of this specification, in which—

Figure 1:
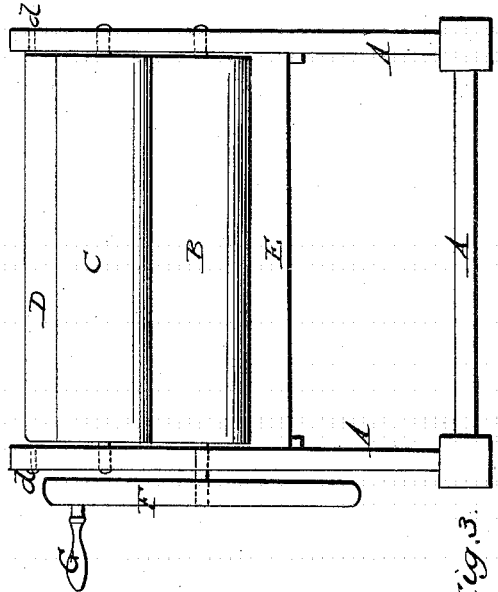
Figure 3:
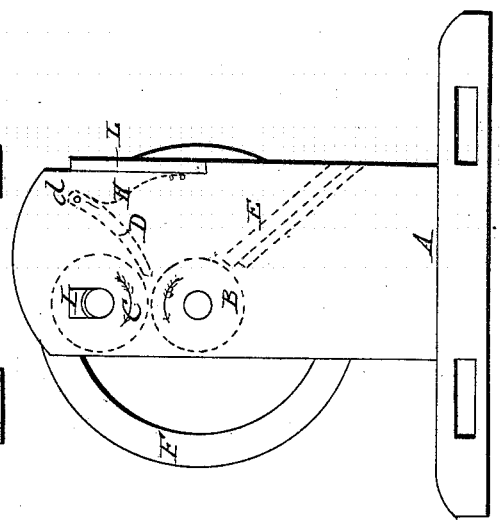
Figure 2:
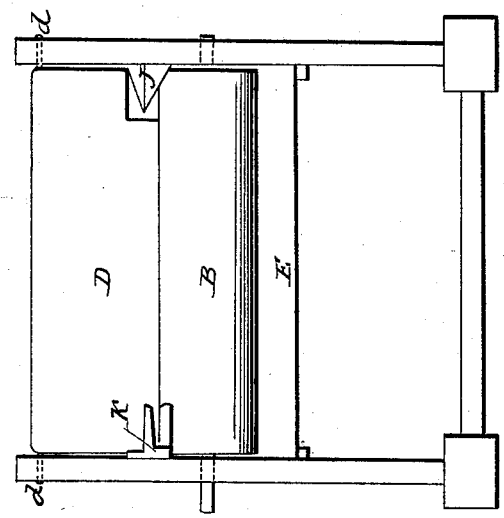
Figure 4:
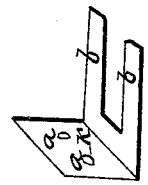

Figure 1 is a front elevation showing both rolls; Fig. 2, a similar view with the top roll removed; Fig. 3, an elevation end view; and Fig. 4 is a perspective view of the slotted projection removed from the machine.

Similar parts are indicated by the same letters of reference in all the figures.

The nature of my invention consists in a combination of parallel rolls, B, C, spring-board, D, slotted projection, K, and conical projection, J, substantially as, and for the purposes, herein after described.

To enable others skilled in the art to make and use my invention, I will now describe its construction and operation.

A is a wooden frame.

B is a wooden roll about five inches in diameter and about fourteen in length, and covered with india rubber. To one end of the journal of this roll (as seen in Fig. 1) is attached a fly-wheel, F, provided with a crank, G. C is another wooden roll, of the same diameter and length, as B, but smooth and not covered with rubber. This roll is pressed down, so as to rest upon B, by means of a rubber spring, or its equivalent, I, as shown in Fig. 3; and is rotated by friction upon B, or the intervening husks.

D is the spring-board, hinged to the sides of the frame, as shown in Fig. 1, by means of pins, *d, d*, and shaped concave to the rolls as represented in Fig. 3;—one of the lower corners being cut out (see Fig. 2) so as to make room for the conical projection, J.

H is a flat spring the lower end of which is attached to the back board, L; the upper end pressing against the board, D, and holding it, when not acted upon by an ear of corn, in the position represented in Fig. 3.

K is the slotted projection shaped as shown in Fig. 4, and made of iron or steel, and confined to the side of the frame, as represented in Fig. 2, by means of screws, *a, a*. The prongs, *b, b*, are about three inches long, their under sides being concave so as to conform to the circumference of the rolls close to which they are placed—the one prong over B, and the other over C; the slot being directly over, and parallel with, the junction of the rolls, so that the husks may be drawn through said slot, while the prongs, *b, b*, prevent the butt of the ear from being shelled and drawn too tightly against the rolls, at the time of greatest strain, or while severing the husks.

J is a wedge-shaped, or conical projection attached to the side of the frame, as shown in Fig. 2, and operating to prevent the smaller end of the ear from being drawn from the rolls by the action of severing the husks from the butt.

E is an inclined guide-board situated as shown in Fig. 3, and confined, at its two ends, to the sides of the frame by cleats or in any other suitable manner. The design of this board is to receive the husked ear and guide it to the floor or into any suitable receptacle.

In order to husk, the operator, turning the crank, G, drops one ear of corn at a time upon the spring-board, D, with the butt end toward the slotted projection, K,—when the husks and silk are completely stripped from the ear by the action of the rolls, the husked ear remaining between the rolls and spring-board until released (and suffered to drop upon the inclined board, E) by the introduction of another unhusked ear which presses back the spring-board sufficiently for that purpose. Thus corn can be husked as rapidly as a person can throw it in, the husks being delivered in front of the machine, and the ears in the rear.

The machine is simple, easily kept in repair, and operated with but little power.

What I claim as my invention and desire to secure by Letters Patent is,

The combination of the rolls, B and C, spring-board, D, slotted projection, K, and conical projection, J, when these several parts are constructed and arranged for operation in the manner described, and for the purpose specified.

ABBOT R. DAVIS.

Witnesses:
N. AMES,
GEO. H. SMITH.